United States Patent
Kaufer et al.

(10) Patent No.: US 10,394,587 B2
(45) Date of Patent: *Aug. 27, 2019

(54) SELF-TERMINATING OR SELF-SHELVING VIRTUAL MACHINES AND WORKLOADS

(71) Applicant: International Business Machines Corporation, Armonk, NY (US)

(72) Inventors: Steven R. Kaufer, Rochester, MN (US); Samuel D. Matzek, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/989,173

(22) Filed: Jan. 6, 2016

(65) Prior Publication Data
US 2017/0192808 A1   Jul. 6, 2017

(51) Int. Cl.
*G06F 9/455*   (2018.01)

(52) U.S. Cl.
CPC .. *G06F 9/45558* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 8,161,479 | B2 | 4/2012 | Sedukhin et al. |
| 8,612,599 | B2 | 12/2013 | Tung et al. |
| 8,789,041 | B2 | 7/2014 | Verma |
| 2010/0057831 | A1 | 3/2010 | Williamson |
| 2011/0041126 | A1 | 2/2011 | Levy et al. |
| 2012/0047240 | A1 | 2/2012 | Keohane et al. |
| 2012/0096149 | A1 | 4/2012 | Sunkara et al. |
| 2012/0222041 | A1 | 8/2012 | Sabin et al. |
| 2013/0019015 | A1 | 1/2013 | Devarakonda et al. |
| 2013/0091285 | A1 | 4/2013 | Devarakonda et al. |

(Continued)

FOREIGN PATENT DOCUMENTS

WO  2014058411 A1  4/2014
WO  WO 2015/192881  * 12/2015  ......... G06F 9/45558

OTHER PUBLICATIONS

U.S. Appl. No. 15/040,809, entitled "Self-Terminating or Self-Shelving Virtual Machines and Workloads", filed Feb. 10, 2016.

(Continued)

*Primary Examiner* — Duy Khuong T Nguyen
*Assistant Examiner* — Melissa A Headly
(74) *Attorney, Agent, or Firm* — Patterson + Sheridan, LLP

(57) ABSTRACT

Systems and computer program products to perform an operation comprising receiving a request to perform a predefined operation on at least one of a virtual machine and a workload executing on a host in a first cloud computing environment, identifying a set of credentials to access the first cloud computing environment, and initiating performance of the predefined operation on the at least one of the virtual machine and the workload, wherein the predefined operation comprises at least one of: (i) deleting, and (ii) shelving the at least one of the virtual machine and the workload.

15 Claims, 12 Drawing Sheets

(56) References Cited

U.S. PATENT DOCUMENTS

| | | | |
|---|---|---|---|
| 2013/0097603 A1* | 4/2013 | Amano | G06F 9/4843 718/1 |
| 2014/0136706 A1 | 5/2014 | Elzur | |
| 2014/0137112 A1* | 5/2014 | Rigolet | G06F 9/45558 718/1 |
| 2015/0052218 A1 | 2/2015 | Zhang et al. | |
| 2017/0109204 A1* | 4/2017 | Feng | G06F 9/50 |

OTHER PUBLICATIONS

IBM "List of IBM Patents or Patent Applications Treated as Related".

Ruiz-Alvarez et al.; "An Automated Approach to Cloud Storage Service Selection", ScienceCloud'11, Jun. 8, 2011, pp. 1-10, <http://www.cs.virginia.edu/~ar5je/sci705-ruiz-alvarez.pdf>.

Redl, et al.; "Automatic SLA Matching and Provider Selection in Grid and Cloud Computing Markets", pp. 1-10, Distributed Systems Group, Institute of Information Systems Vienna University of Technology, Austria, <http://www.infosys.tuwien.ac.at/staff/breskovic/papers/RedlBreskovicBrandicDustdar_Grid2012.pdf>.

Li et al; "CloudCmp: Shopping for a Cloud Made Easy", pp. 1-7, <http://www.cs.duke.edu/~angl/papers/hotcloud10-cloudcmp.pdf>.

Zaman et al.; "Efficient Bidding for Virtual Machine Instances in Clouds", pp. 1-2, <http://salsahpc.indiana.edu/CloudCom2010/EPoster/cloudcom2010_submission_257.pdf>.

Springer "Complex Service Provisioning in Collaborative Cloud Markets", Lecture Notes in Computer Science vol. 6994, 2011, pp. 88-99, <http://rd.springer.com/chapter/10.1007/978-3-642-24755-2_8>.

Gravitant "Cloud Brokerage for Solution Providers", <http://www.gravitant.com/the-cloud-brokerage.html>.

Ruiz-Alvarez et al.; "An Automated Approach to Cloud Storage Service Selection", ScienceCloud'11, Jun. 8, 2011, pp. 1-10.

Redl, et al.; "Automatic SLA Matching and Provider Selection in Grid and Cloud Computing Markets", pp. 1-10, Distributed Systems Group, Institute of Information Systems Vienna University of Technology, Austria.

"Cloud Assessment Tool", retrieved Jun. 4, 2014, <http://www.asiacloud.org/index.php/20112-07-17-08-34-39/cloud-assessment>.

"Cloud Assessment Tool Launched", retrieved Jun. 4, 2014, <http://www.asiacloud.org/index.php/2012-07-17-08-33-19/2013-02-20-09-06-35/press-release-vendor-neutral-cat>.

Li et al; "CloudCmp: Shopping for a Cloud Made Easy", pp. 1-7.

Zaman et al.; "Efficient Bidding for Virtual Machine Instances in Clouds", pp. 1-2.

"New CopperEgg Cloud Sizing Tool Helps Enterprises Choose the Perfect Amazon EC2 Instance", pp. 1-3, retrieved Jun. 4, 2014, <http://copperegg.com/new-copperegg-cloud-sizing-tool-helps-enterprises-choose-the-perfect-amazon-ec2-instance/>.

"Open Data Center Alliance—Usage Models", retrieved Jun. 4, 2014, pp. 1-3, <http://www.opendatacenteralliance.org/ourwork/usagemodels>.

"The Service Catalog: Demystifying Cloud"; Industry Perspectives Jun. 30, 2011, retrieved Jun. 4, 2014, pp. 1-2, <http://www.datacenterknowledge.com/archives/2011/06/30/the-service-catalog-demystifying-cloud/>.

Springer "Complex Service Provisioning in Collaborative Cloud Markets", Lecture Notes in Computer Science, vol. 6994, 2011, pp. 88-99, <http://rd.cpringer.com/chapter/10.1007/978-3-642-24755-2_8>.

Gravitant "Cloud Brokerage for Solution Providers", 2014, <http://www.gravitant.com/the-cloud-brokerage.html>.

U.S. Appl. No. 14/505,799, entitled "Cloud Independent Tuning Service for Autonomously Managed Workloads", filed Oct. 3, 2014.

U.S. Appl. No. 14/565,566, entitled "Cloud Independent Tuning Service for Autonomously Managed Workloads", filed Dec. 10, 2014.

\* cited by examiner

US 10,394,587 B2

SELF-TERMINATING OR SELF-SHELVING VIRTUAL MACHINES AND WORKLOADS

BACKGROUND

The present disclosure relates to cloud computing, and more specifically, to self-terminating and/or self-shelving virtual machines and workloads in a cloud computing environment.

A virtual machine (VM) may be hosted by a hypervisor which, in a cloud computing environment, is managed by a cloud server. Conventionally, in order for a cloud user to delete or shelve the VM, the user must log into the cloud server and issue a delete or shelve request that targets the specific VM. The shelving of a virtual machine includes capturing the virtual machine's disk state (and optionally its memory state) and removing the virtual machine definition to free the compute, memory, network, and similar resources being consumed. Shelving is used in some cases in places of deleting, such as when the virtual machine or its workload may not be needed for some amount of time, and unshelving is faster than rebuilding the VM, reinstalling its software, reconfiguring its networking, etc.

However, the conventionally available solutions require the user to navigate to the cloud server user interface, locate the correct VM, and then issue the delete or shelve request. This becomes tedious and error prone in a large environment with multiple cloud servers, often causing the VM or workload to not be promptly deleted or shelved, failing to free valuable system resources.

Another conventional solution provides workloads and VMs that may auto-delete or auto-shelve after a given period of time (i.e., time-out). The drawback of this conventional solution is that it encourages a user to not manually remove VMs once they no longer need them, wasting resources until the VM or workload eventually times out.

SUMMARY

Embodiments disclosed herein provide systems and computer program products to perform an operation comprising receiving a request to perform a predefined operation on at least one of a virtual machine and a workload executing on a host in a first cloud computing environment, identifying a set of credentials to access the first cloud computing environment, and initiating performance of the predefined operation on the at least one of the virtual machine and the workload, wherein the predefined operation comprises at least one of: (i) deleting, and (ii) shelving the at least one of the virtual machine and the workload.

DETAILED DESCRIPTION

Embodiments disclosed herein leverage an independent resource tuning service to automatically perform a predefined operation on a workload (and/or a virtual machine) when the workload and/or virtual machine are no longer needed. The predefined operation may include deleting and/or shelving the workload and/or the virtual machine. A user, the independent resource tuning service, the workload, and the virtual machine may all initiate a deletion or shelving process. For example, the workload and/or virtual machine may be configured to report to the independent resource tuning service that their functions have been performed and that they may be shelved or deleted. Similarly, the independent resource tuning service (also referred to as a "tuning service" herein) may determine that the workload and/or the virtual machine have completed their functions and should be shelved or deleted.

Figure 1A:
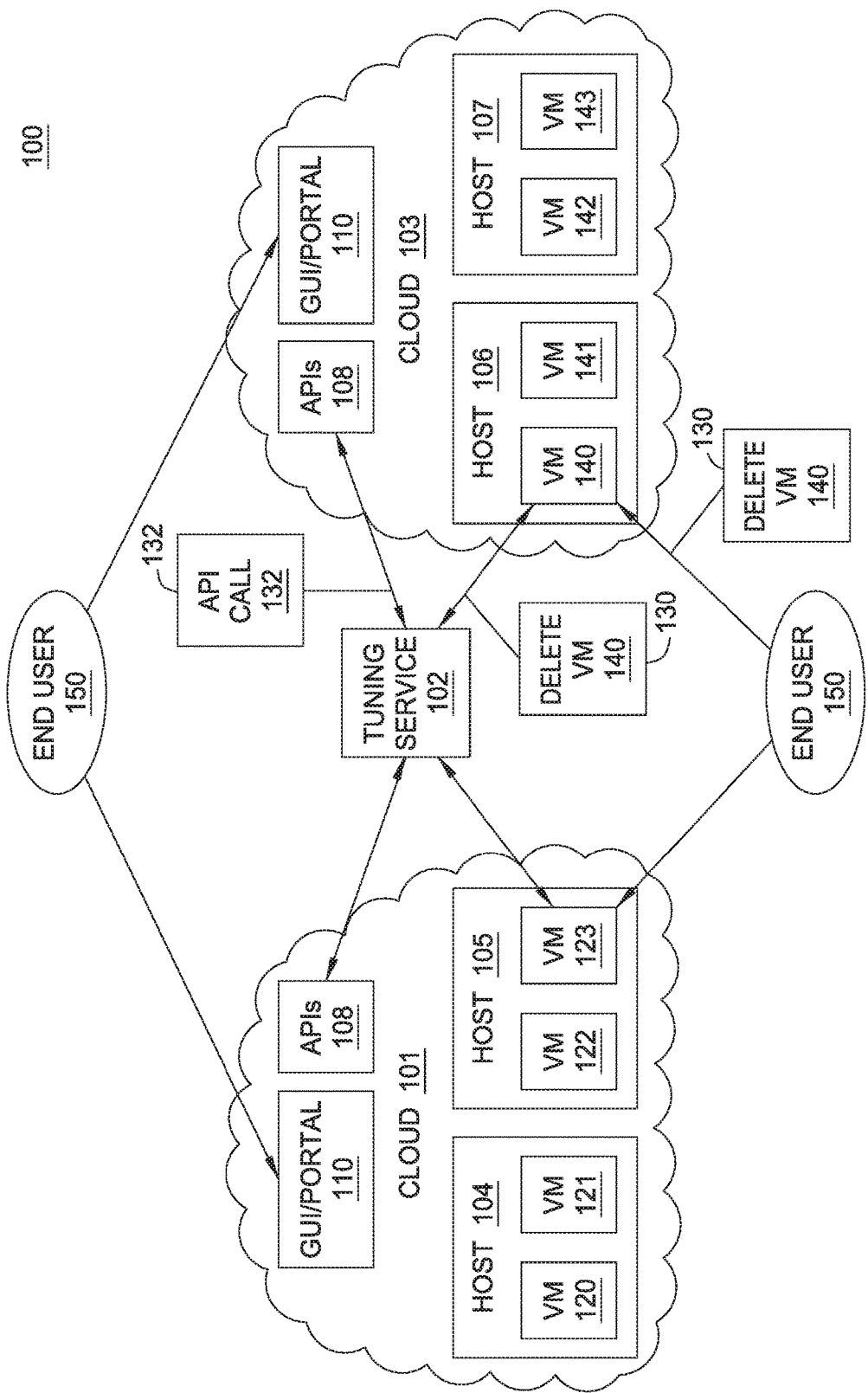
FIGS. 1A-1D illustrates a system which provides self-terminating and/or self-shelving virtual machines and workloads in a cloud computing environment, according to various embodiments.

FIG. 1A illustrates system 100 which provides self-terminating and/or self-shelving virtual machines and/or workloads in a cloud computing environment, according to one embodiment. As shown, the system 100 includes a cloud 101, a tuning service 102, and a cloud 103. The clouds 101, 103 are cloud computing environments, which, in at least one embodiment, are provided by different cloud providers. The tuning service 102 operates in a push or pull model to provide platform-independent resource management. More specifically, the tuning service 102 is configured to shelf and/or delete virtual machines and workloads in the cloud computing environments 101 and 103. In the push model, the tuning service 102 may issue commands to shelve or delete VMs and workloads, while in the pull model, the tuning service 102 receives information from other sources (such as virtual machines and workloads) that allow the tuning service 102 to issue commands to shelve or delete VMs and workloads. In at least one embodiment, the tuning service 102 is external to any given cloud computing environment.

As shown, the clouds 101, 103 each include an example graphical user interface 110 (also referred to as a portal) and a set of application programming interfaces (APIs) 108. Each of the clouds 101, 103 further include compute hosts which are configured to execute virtual machines and workloads. As shown, cloud 101 includes example hosts 104, 105, while cloud 103 includes example hosts 106, 107. As shown, compute host 104 executes virtual machines 120, 121, while compute host 105 executes virtual machines 122, 123. Similarly, host 106 executes example virtual machines 140, 141, and host 107 executes example virtual machines 142, 143. Workloads are not depicted in FIG. 1A for the sake of clarity. Generally, a workload is a set of computing tasks, while a virtual machine is a software implementation of a machine (for example, a computer) that executes programs like a physical machine. In at least one embodiment, workloads may execute within a virtual machine.

As shown, end users 150 may interact with the GUI 110 and the virtual machines of the clouds 101, 103. The end users 150 may initiate shelve and/or delete requests by being logged into the virtual machines 120-123, 140-143 via the respective cloud GUIs 110. For example, as shown, the user has issued a request 130 to delete the workload 140 from host 106. For example, the request 130 may be a command or other action that is executed from within the VM 140. In turn, the VM 140 forwards the request 130 to the tuning service 102. The tuning service 102 in turn knows which cloud the VM 140 is located in, and may issue an API call 132 to the APIs 108 of the cloud 103. The API call 132 may be specific to the cloud 103, and initiates the deletion of VM 140 from host 106. The API call 132 may further include login credentials required to delete the VM 140 from host 106. Advantageously, the user 150 does not need to know what cloud the VM 140 is located in and what the credentials are.

Figure 1B:
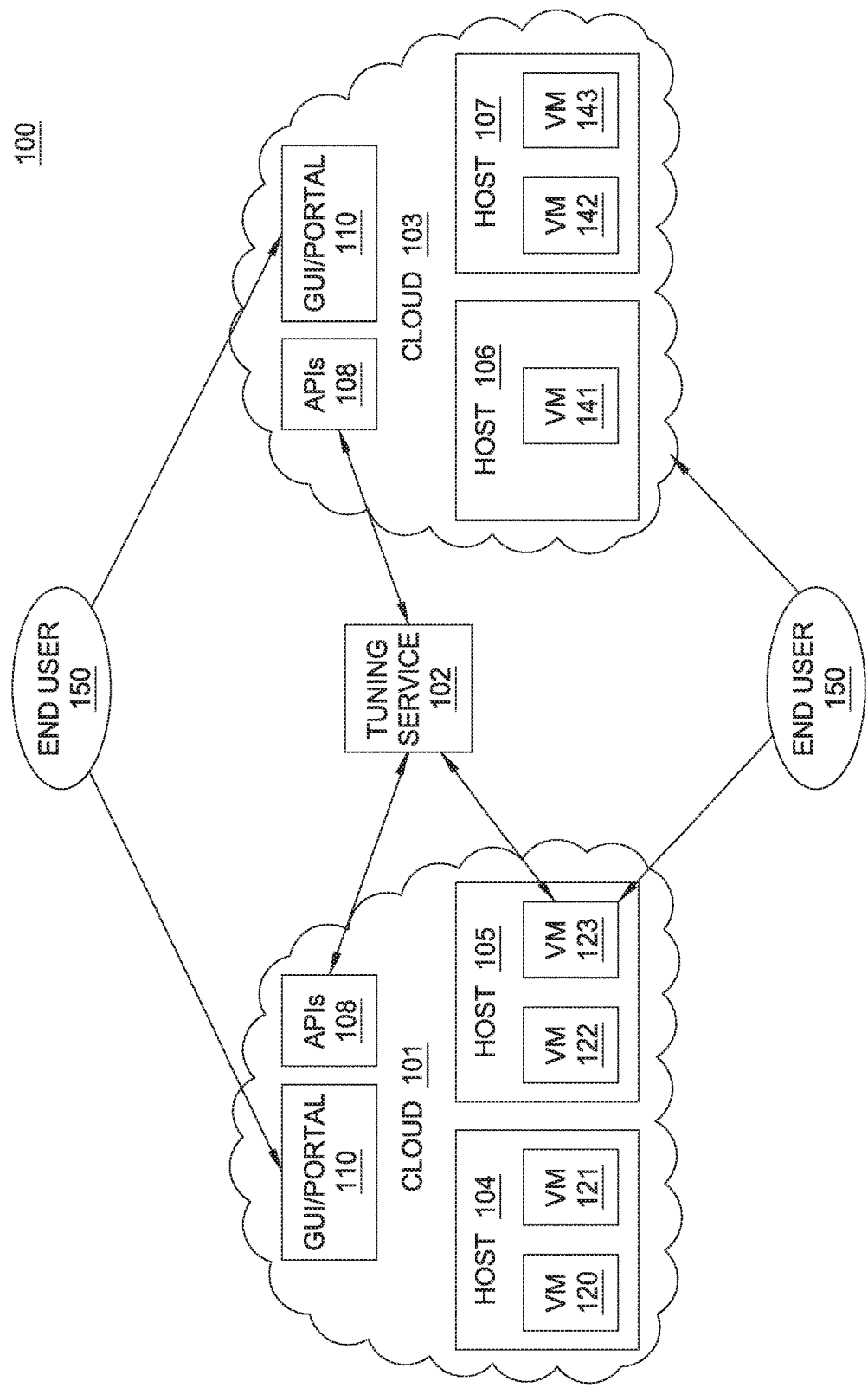

FIG. 1B depicts the host 106 after the tuning service 102 has caused the deletion of the VM 140. As shown, the host 106 executes VM 141, but no longer executes VM 140, which has been deleted. Although depicted with reference to a delete operation, the techniques described with reference to FIGS. 1A-1B apply equally to shelving virtual machines (or workloads). However, in shelving a virtual machine or workload, the disk state is preserved for future use, e.g., an image of the VM or workload is stored in a storage location. Similarly, the system memory state may also be preserved. Doing so allows the VM or workload to be redeployed on the host without having to deploy a fresh VM on the host, configuring the VM and workload, and the like.

Figure 1C:
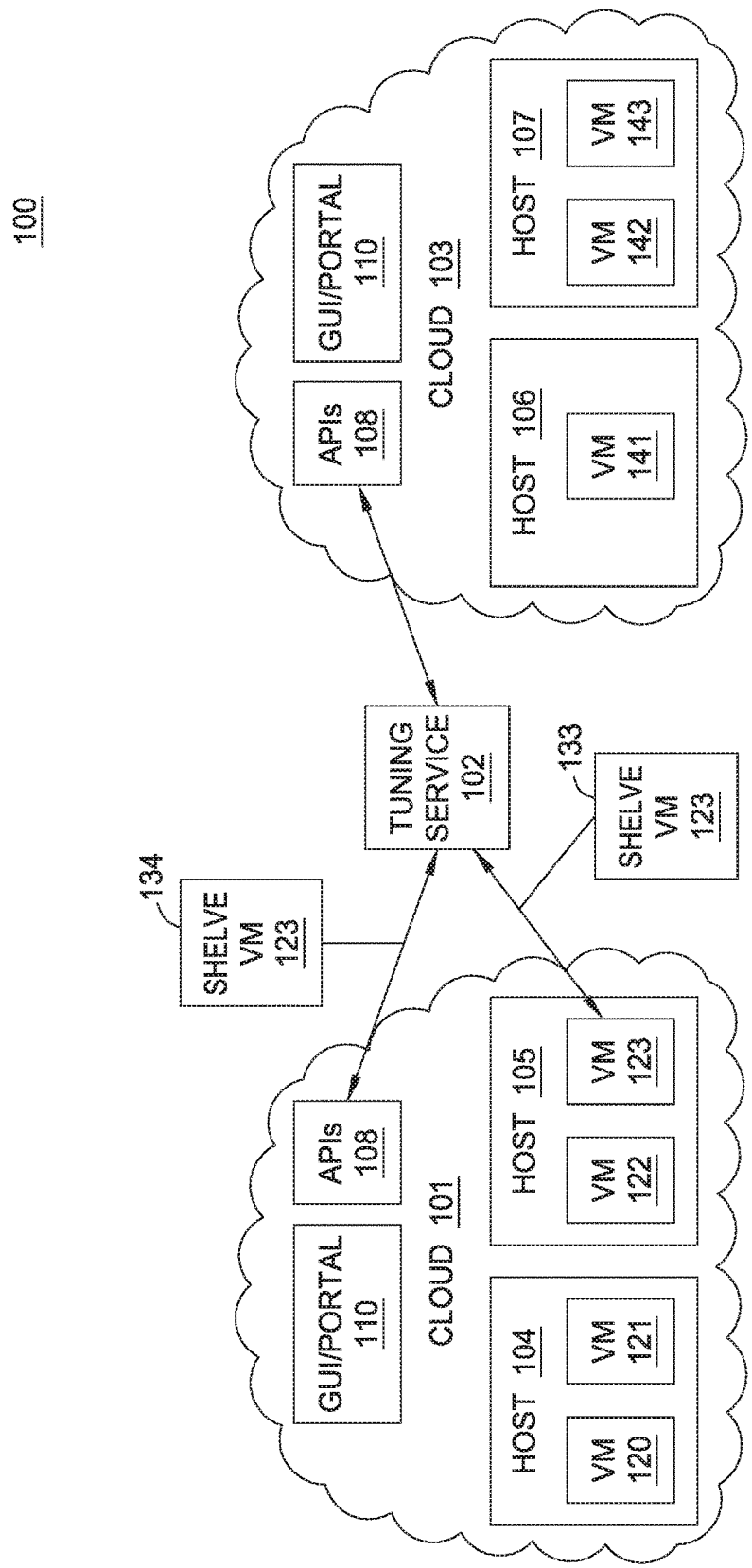

FIG. 1C depicts an embodiment where a VM may provide self-delete and/or self-shelve requests to the tuning service 102. As shown, VM 123 has issued a self-shelve request 133 to the tuning service 102. Generally, in issuing a self-shelve (or a self-delete) request, the VM 123 has made the determination that it is not currently needed, and can be shelved or deleted. For example, the VM 123 may include a workload 120 deployed to perform analytics on a data set. When the workload completes the analytics, the workload and/or the VM 123 may determine its functions have been performed, and that the workload and/or the VM 123 is no longer needed. Therefore, the VM 123 (or the workload) may send the self-delete request 133 to the tuning service 102. As another example, the VM 122 may host the workload 120.

Figure 1D:
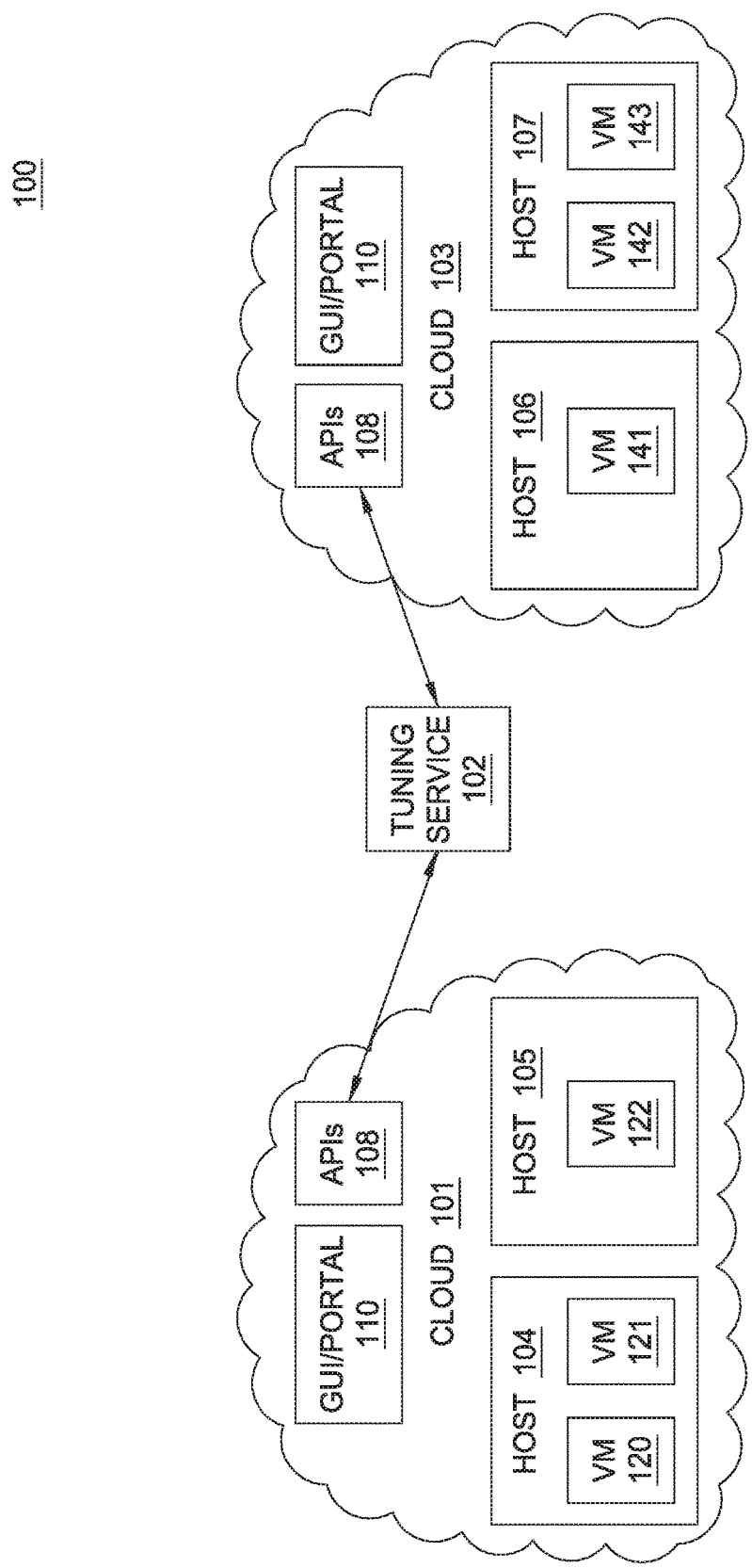

The tuning service 102 may receive the request 133, identify the cloud that the VM 123 executes on, and may identify any credentials required to modify the VM 123. The tuning service 102 may then transmit an API call 134 which specifies to shelve the virtual machine 123. The API call 134 may then be processed by the APIs 108 of cloud 101, causing the shelving of VM 123. FIG. 1D depicts the host 105 after the tuning service 102 has caused VM 123 to be shelved. As shown, the host 105 continues to execute the virtual machine 122, while virtual machine 123 has been shelved.

Figure 2:
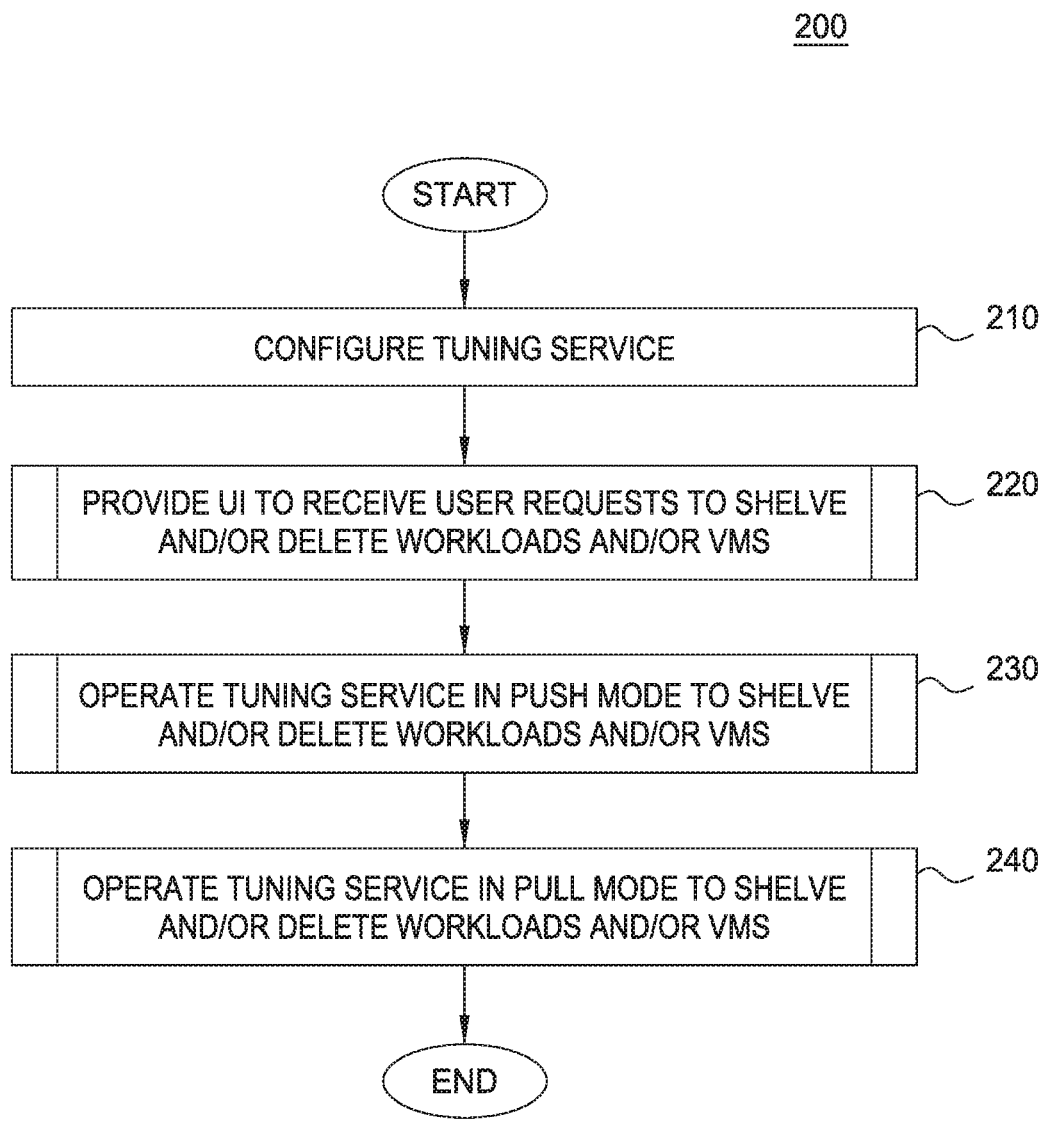
FIG. 2 is a flow chart illustrating a method to provide self-terminating and/or self-shelving virtual machines and workloads in a cloud computing environment, according to one embodiment.

FIG. 2 is a flow chart illustrating a method 200 to provide self-terminating and/or self-shelving virtual machines and workloads in a cloud computing environment, according to one embodiment. Generally, the method 200 allows users, the tuning service 102, workloads, and virtual machines to initiate a process to shelve or delete workloads and virtual machines in a cloud computing environment.

As shown, the method 200 begins at block 210, where the tuning service 102 is configured to operate in a platform-independent manner. As previously indicated, the tuning service 102 may be external to any given cloud computing platform. Therefore, block 210 may include defining configuring data for the tuning service 102, and may include any type of settings to facilitate the platform independent nature of the tuning service 102. For example, the configuration may specify timing thresholds or resource use thresholds which may cause the tuning service 102 to shelve or delete a virtual machine and/or workload. The configuration may also specify preferences for each of a plurality of virtual machines and workloads, such as whether to shelve or delete the VMs or workloads. Further still, the configuration may provide abstractions that translate abstract requests. The abstractions allow users, VMs, and workloads to issue abstract requests for resource modifications as well as abstract shelve and delete requests.

At block 220, described in greater detail with reference to FIG. 3, a user interface is provided to receive user requests to shelve and/or delete workloads and VMs. The user interface may allow a user to view virtual machines and workloads executing on each of a plurality of hosts in each of a plurality of cloud environments. The user may then issue commands from within the VMs and workloads for shelving and/or deletion. At block 230, the tuning service 102 may be operated in a push mode to shelve and delete workloads and VMs in the cloud environment. When in the push mode, workloads and VMs can push an abstract delete or shelve request to the tuning service 102. For example, a workload may request "delete me" of the tuning service 102. The tuning service 102 may translate the abstract request to a set of platform-specific operations that cause the workload to be deleted from a compute node. In at least one embodiment, the tuning service 102 issues one or more API calls to the APIs 108 of a cloud to fulfill the request. At block 204, the tuning service 102 may be operated in a pull mode to shelve and delete workloads and VMs. When in the pull mode, the tuning service 102 may monitor workloads and VMs to determine when processing is complete, and issue an appropriate shelve or delete request for the VM and/or workload in the relevant cloud or virtualization management environment. In at least one embodiment, the tuning service 102 issues one or more API calls to the APIs 108 of a cloud to fulfill the request initiated by the tuning service 102. In at least one embodiment, the tuning service 102 may simultaneously operate in both the push mode and the pull mode.

Figure 3:
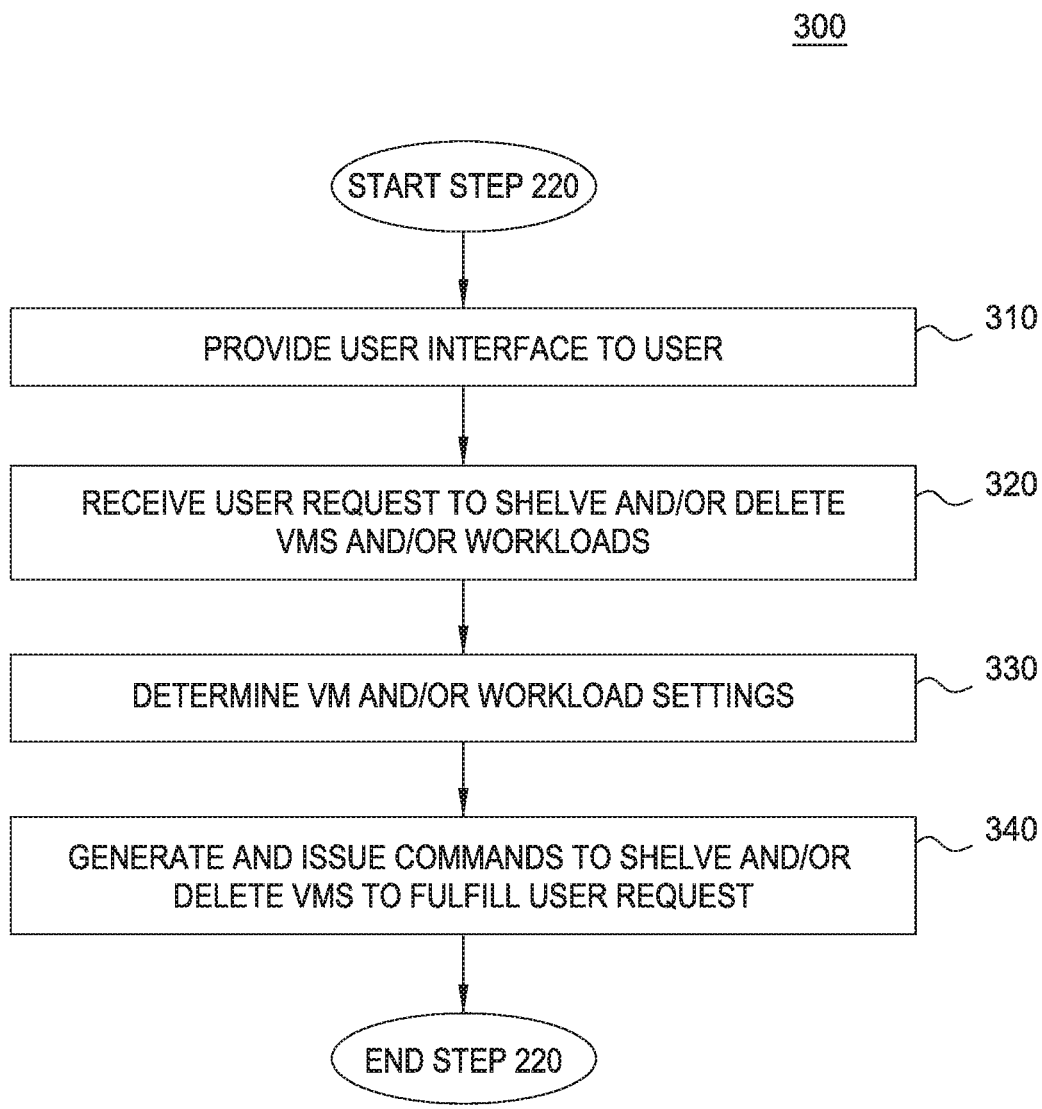
FIG. 3 is a flow chart illustrating a method to provide a user interface to receive user requests to shelve and/or delete workloads and/or virtual machines, according to one embodiment.

FIG. 3 is a flow chart illustrating a method 300 corresponding to block 220 to provide a user interface to receive user requests to shelve and/or delete workloads and/or virtual machines, according to one embodiment. Generally, the method 300 allows a user to issue abstract commands to shelve and delete virtual machines and workloads. For example, a user may specify to "delete" a virtual machine. The tuning service 102 may receive the request, which includes an indication of the targeted virtual machine. The tuning service 102 may identify the relevant credentials to modify the virtual machine, and issue platform-specific API commands to delete the virtual machine.

As shown, the method 300 begins at block 310, where a graphical user interface (GUI) is provided to a user. At block 320, the tuning service 102 may receive, from the user, a request to shelve and/or terminate one or more VMs or workloads. At block 330, the tuning service 102 may identify the relevant API calls, settings, and credentials required to modify the VMs and workloads specified in the request. At block 340, the tuning service 102 may generate and issue the appropriate platform-specific commands to shelve and/or delete the VMs and/or workloads.

Figure 4:
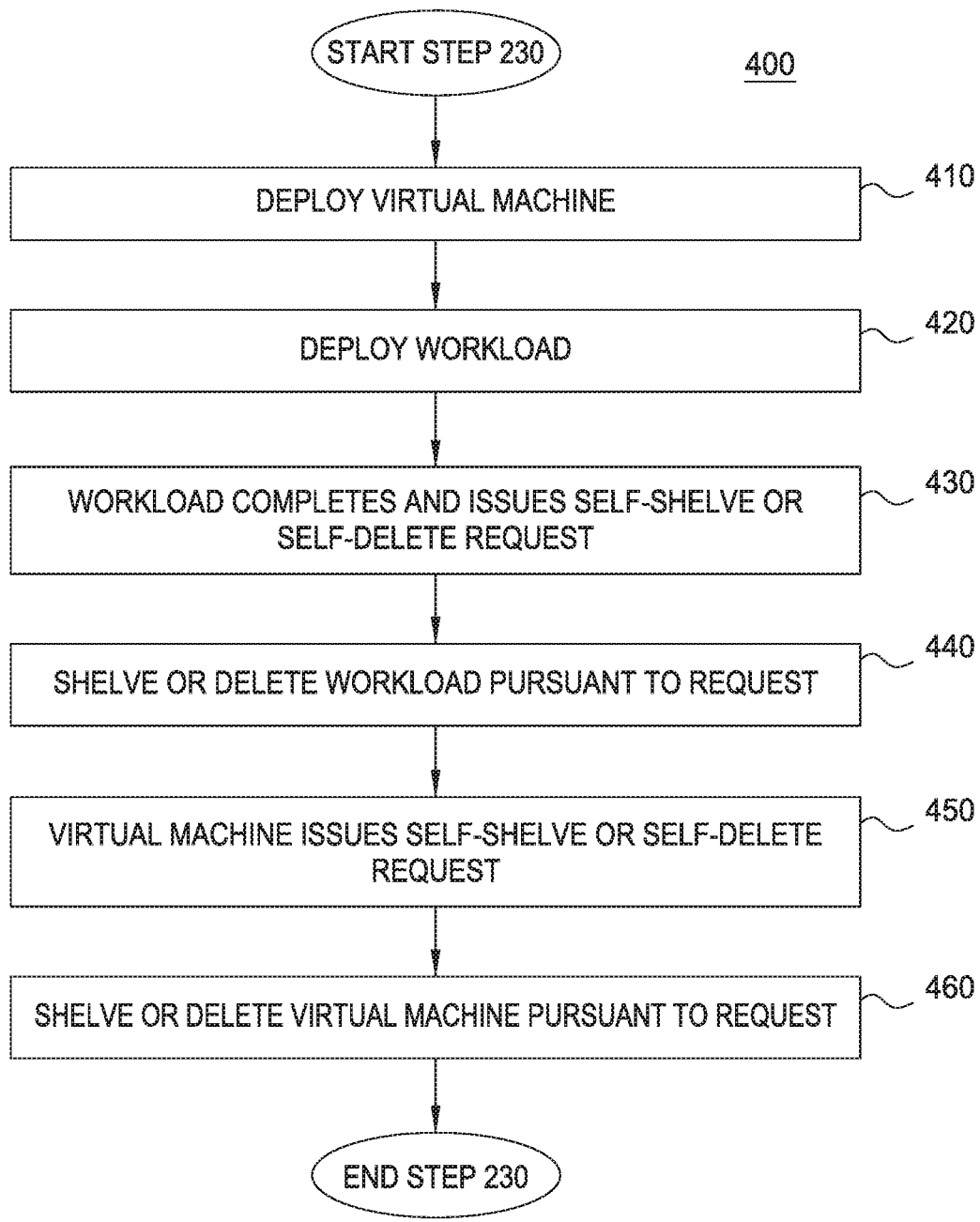
FIG. 4 is a flow chart illustrating a method to operate a tuning service in a push mode to shelve and/or delete workloads and/or virtual machines, according to one embodiment.

FIG. 4 is a flow chart illustrating a method 400 corresponding to block 230 to operate a tuning service in a push mode to shelve and/or delete workloads and/or virtual machines, according to one embodiment. Generally, the method 400 allows VMs and workloads to issue self-shelve and self-delete requests to the tuning service 102, which orchestrates the necessary operations to fulfill the requests. As previously indicated, the self-shelve and self-delete requests may be abstract requests, which the tuning service 102 may translate into platform-specific commands that can be applied to the relevant computing platform to shelve and delete VMs and workloads.

As shown, the method 400 begins at block 410, where a virtual machine may be deployed to a host in a cloud environment. At block 420, a workload may be deployed to a host in the cloud environment. In at least one embodiment, the workload is deployed in the virtual machine deployed at block 410. At block 430, the workload may complete its sets of tasks, and issue a self-shelve or self-delete request to the tuning service 102. The workload may issue the request upon determining its functions have been completed and the workload is no longer needed. At block 440, the tuning service 102 may orchestrate the shelving or deleting of the workload pursuant to the request. For example, the request may be a generic request to "shelve workload" from a workload. The tuning service 102 may translate the request to a set of proprietary commands that causes the workload to be shelved.

At block 450, a virtual machine may issue a self-shelve or a self-delete request. The virtual machine may issue the request upon determining its functions have been completed and the virtual machine is no longer needed. In at least one embodiment, a virtual machine may generate and issue a request to shelve or delete a workload which has completed processing in the virtual machine. At block 460, the tuning service 102 may orchestrate the shelving or deleting of the VM pursuant to the request. For example, the request may be a generic request to "delete me" from a virtual machine. The tuning service 102 may translate the request to a set of proprietary commands (such as an API call) that causes the virtual machine to be deleted. The tuning service 102 may then send the API call to the cloud, which causes the virtual machine to be deleted.

Figure 5:
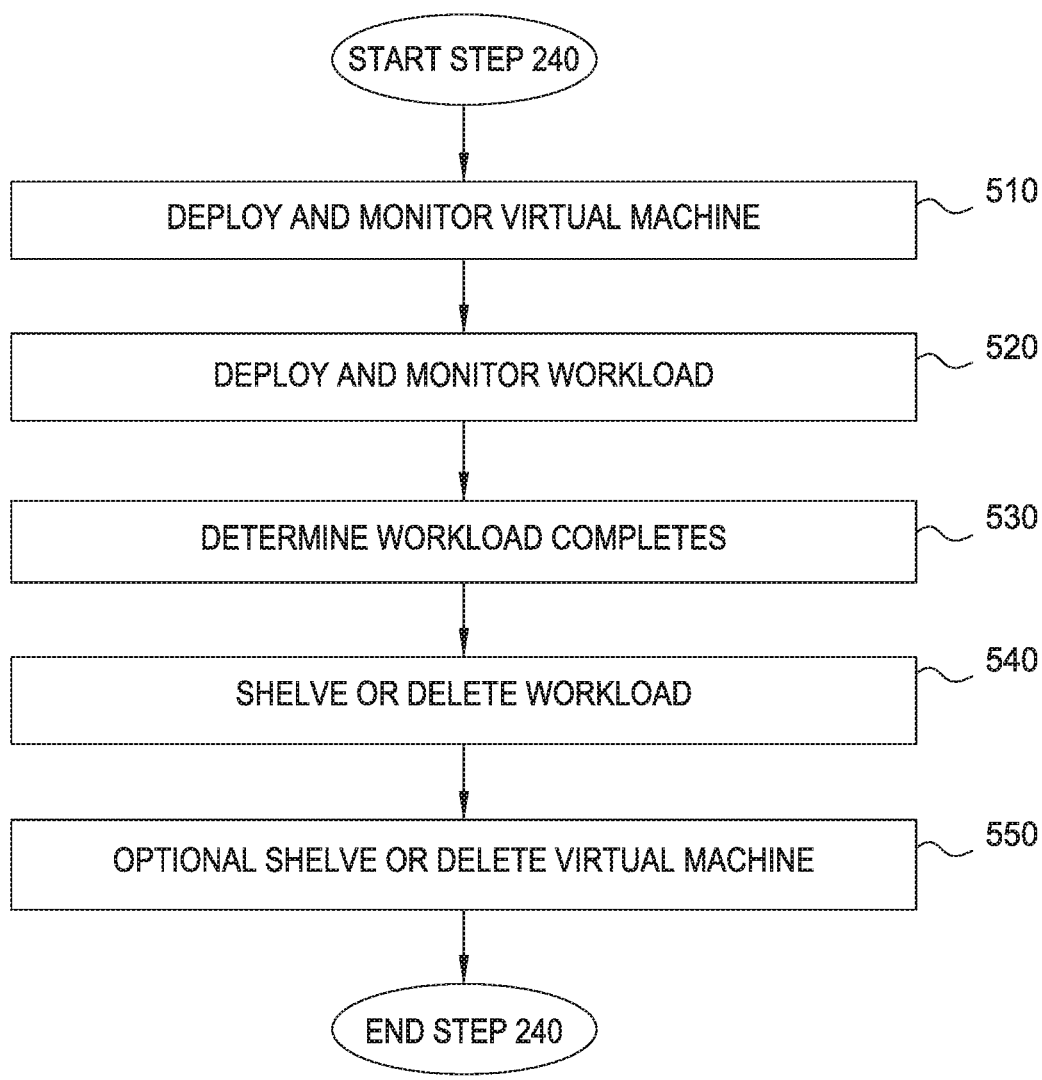
FIG. 5 is a flow chart illustrating a method to operate a tuning service in a pull mode to shelve and/or delete workloads and/or virtual machines, according to one embodiment.

FIG. 5 is a flow chart illustrating a method 500 corresponding to block 240 to operate a tuning service in a pull mode to shelve and/or delete workloads and/or virtual machines, according to one embodiment. Generally, the method 500 allows the tuning service 102 to monitor workloads and virtual machines, and issue shelve or delete commands when the workload or virtual machine is no longer needed. As shown, the method 500 begins at block 510, where the tuning service 102 monitors a virtual machine that was deployed in a cloud environment. At block 520, the tuning service 102 may monitor a workload that is deployed in the cloud environment. In at least one embodiment, the workload is deployed in the virtual machine deployed at block 510. In monitoring VMs and workloads, the tuning service 102 may monitor resource usage rates, such as CPU utilization, memory utilization, and the like. At block 530, the tuning service 102 may determine that the workload has completed. The tuning service 102 may determine that the workload has completed in any number of ways, including identifying completed output files, determining that the workload is not using any system resources, and the like. At block 540, the tuning service 102 may shelve or delete the workload. To shelve or delete the workload, the tuning service 102 may issue one or more API calls to the cloud hosting the workload. At block 550, the tuning service 102 may optionally shelve or delete the virtual machine. To shelve or delete the VM, the tuning service 102 may issue one or more API calls to the cloud hosting the VM. Generally, in determining whether to shelve or delete VMs and workloads, the tuning service may consider whether the VM or workload may be subsequently needed, may identify VM or workload specific settings (that indicate whether to shelve or delete), and the like.

Figure 6:
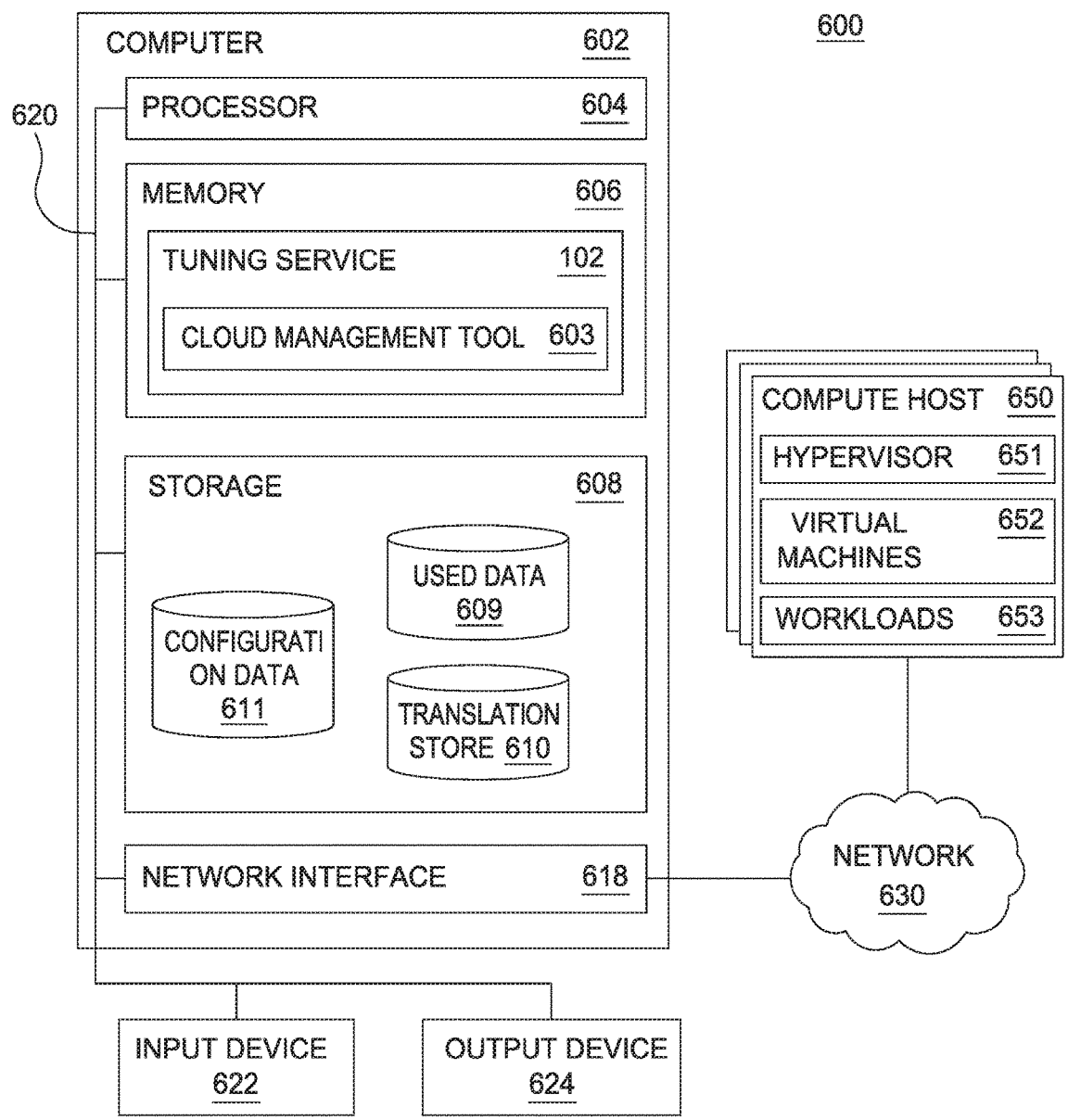
FIG. 6 illustrates a system configured to provide self-terminating and/or self-shelving virtual machines and workloads in a cloud computing environment, according to one embodiment.

FIG. 6 illustrates a system 600 configured to provide self-terminating and/or self-shelving virtual machines and workloads in a cloud computing environment, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the tuning service 102 and a cloud management tool 603. As previously described, the tuning service 102 is a service configured to translate abstract requests issued by the workloads, virtual machines, and users, and interface with the management tool 103 in order to fulfill requests to shelve and delete VMs and workloads. The tuning service 102 is further configured to initiate the deletion and shelving of VMs and workloads. Generally, shelving a VM or workload causes the VM or workload to be removed from a host, 650, however, a disk image and/or memory state may be saved such that the VM or workload can easily be restored without requiring a blank-state VM. The cloud provider management tool 603 is an interface used to manage resources in the cloud computing environment. One example of such a management tool is xCAT (Extreme Cloud Administration Toolkit), developed by IBM, which is configured to manage the compute nodes by interfacing with a plurality of different hypervisors.

As shown, storage 608 contains the use data 609, the translation store 610, and configuration data 611. The use data 609 may include resource utilization levels of different workloads under different resource allocations. The tuning service 102 may reference the use data 609 to determine whether a workload or VM has completed its tasks or is generally not performing any functions. The translation store 610 may generally include information that allows the tuning service 102 to convert abstract requests from the workloads and VMs to specific requests understandable by the management tool 603. The configuration data 611 may include general configuration information for the tuning service 102, capabilities of each of a plurality of cloud providers, and APIs or libraries that allow the tuning service 102 to communicate with each cloud provider. The configuration data 611 may further include login credentials (such as administrator usernames and passwords) for hypervisors 651, virtual machines 652, and workloads 653 executing on a plurality of compute hosts 650 in a plurality of different clouds.

As shown, a plurality of compute hosts 650 execute hypervisors 651, virtual machines 652, and workloads 653. Generally, a hypervisor 651 creates, manages, runs, and deletes virtual machines 652 on the compute nodes 650. The virtual machines 652 may execute any type of software, including the workloads 652. The workloads 653 may be services or collections of code that can be executed.

Advantageously, embodiments disclosed herein provide techniques to facilitate shelving and deletion of virtual machines and workloads across different cloud computing environments. The tuning service disclosed herein may receive requests from users, virtual machines, and workloads to shelve and delete workloads and/or virtual machines. The tuning service may also monitor workloads and virtual machines to initiate the deletion or shelving of virtual machines and workloads. Doing so may result in freeing system resources more quickly than traditional deletion or shelving processes, which may wait for predefined idle timers to expire before these processes are initiated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
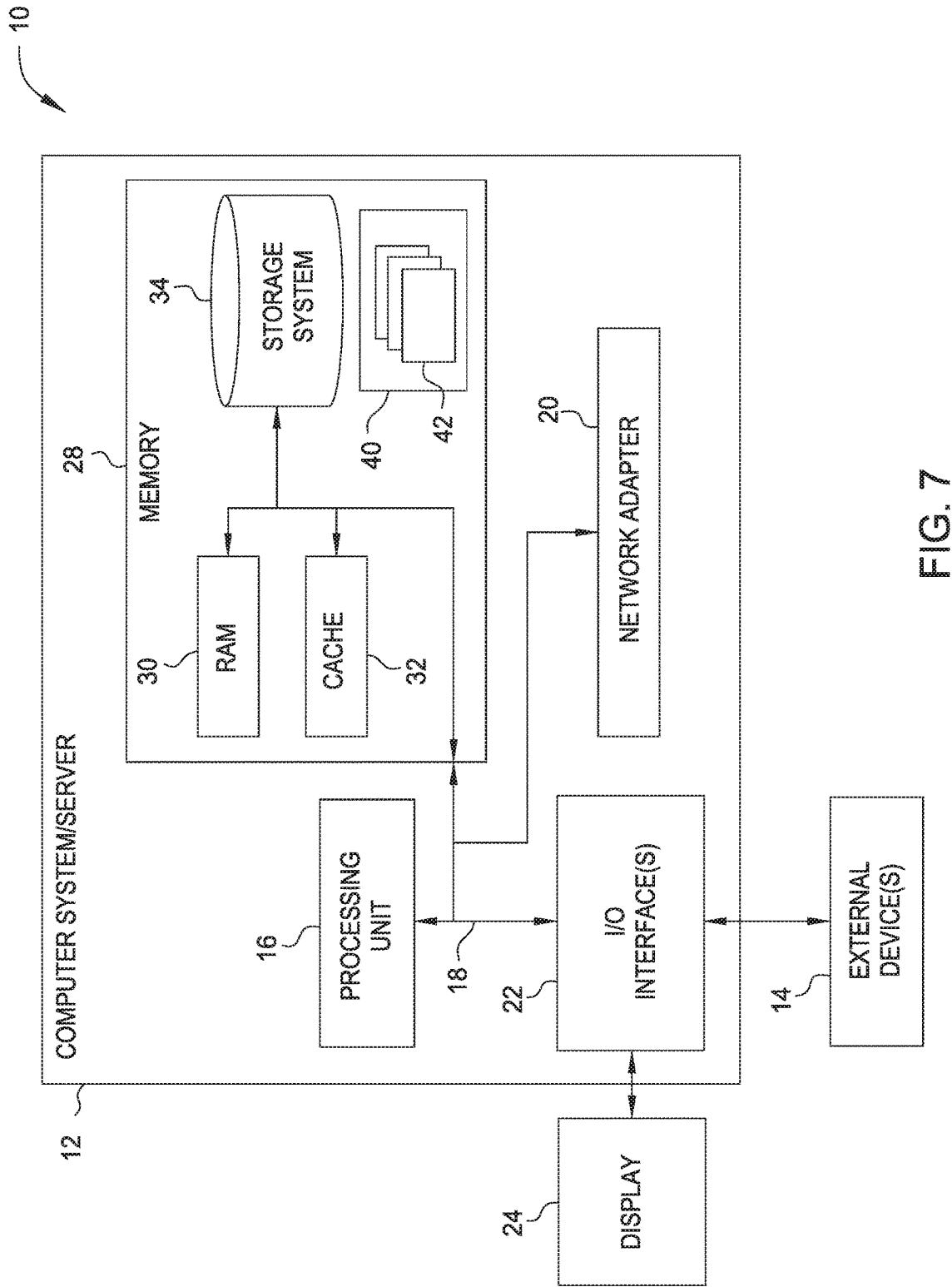
FIG. 7 depicts a cloud computing node according to one embodiment.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
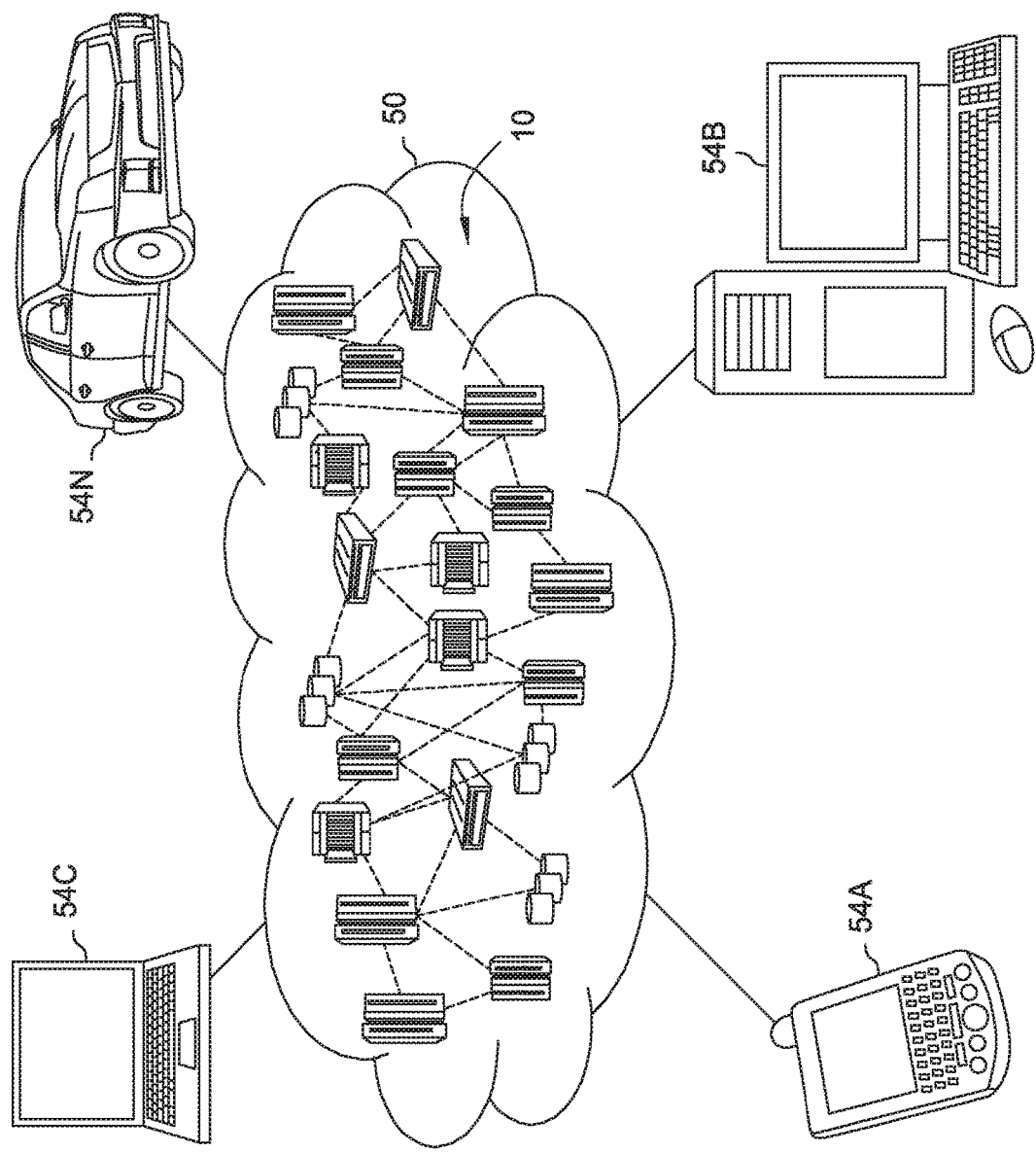
FIG. 8 depicts a cloud computing environment according to one embodiment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
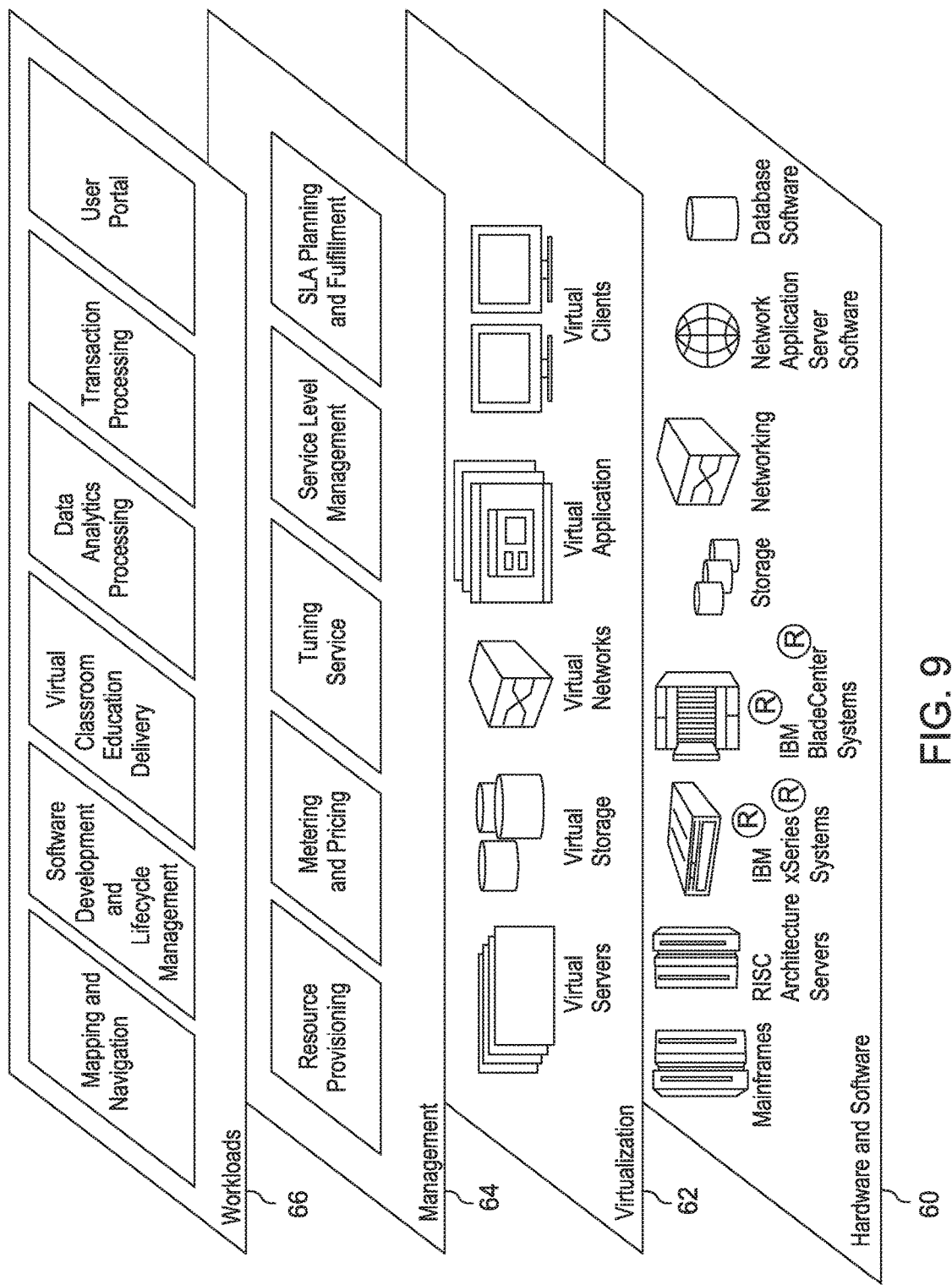
FIG. 9 depicts abstraction model layers according to one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. The tuning service provides support for shelving and deleting virtual machines and workloads based on abstract requests issued from users, virtual machines, and workloads. The tuning service also may monitor virtual machines and workloads to initiate the deletion or shelving process. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user portals.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
  a computer processor; and
  a memory containing a program, which when executed by the processor, performs an operation comprising:
    monitoring, by a cloud tuning service, use of each of a plurality of system resources by a first workload executing on a first virtual machine on a first host in a first cloud computing environment, of a plurality of cloud computing environments, wherein the cloud tuning service executes on the system, wherein the system is external to each of the plurality of cloud computing environments;
    determining, by the cloud tuning service, that the use of a first system resource of the plurality of system resources by the first workload does not exceed a threshold;
    determining, based on the use of the first system resource by the first workload not exceeding the threshold, that the first workload has completed processing a set of tasks;
    receiving, by the cloud tuning service from the first workload, a first abstract request to shelve the first workload, wherein the first abstract request identifies the first workload does not identify the first host or the first cloud computing environment, does not include required credentials, and wherein the first abstract request does not include specific operations required to shelve the first workload;

upon receiving the first abstract request, generating, by the cloud tuning service operating external to each of the plurality of cloud computing environments, a specific request that is compatible with the first cloud computing environment by:

determining, by the cloud tuning service, based on a predefined configuration, that the first workload is executing on the first host in the first cloud computing environment;

identifying a first set of commands that are specific to the first cloud computing environment based on the predefined configuration, wherein the first set of commands cause the first cloud computing environment to shelve the first workload and wherein the first set of commands includes at least one command that was not specified in the first abstract request; and identifying a set of login credentials needed to access the first cloud computing environment; and initiating, by the cloud tuning service, shelving of the first workload by transmitting the specific request to the first cloud computing environment, wherein the specific request includes the set of login credentials and the first set commands, and wherein shelving the first workload removes the first workload from the first virtual machine and the first host and stores an image of the first workload in a data store.

2. The system of claim 1, wherein the plurality of system resources comprise: (i) a processor of the first host, (ii) a memory of the first host, and (iii) a network bandwidth of the first host, the operation further comprising:

receiving, by the cloud tuning service from the first virtual machine, a second abstract request to delete the first virtual machine based on the first virtual machine determining the first workload has completed processing the set of tasks;

translating, by the cloud tuning service, the second abstract request to delete the first virtual machine to a second set of commands specific to the first cloud computing environment to delete the first virtual machine; and transmitting, by the cloud tuning service to the first cloud computing environment, the second set of commands specific to the first cloud computing environment to initiate deletion of the first virtual machine.

3. The system of claim 2, wherein the first workload is shelved and the first virtual machine is deleted prior to expiration of a respective timeout value of the first virtual machine and the first workload, wherein expiration of the respective timeout values comprise respective time thresholds for deleting the first virtual machine and shelving the first workload.

4. The system of claim 1, wherein the set of login credentials comprises a username and password to access the first cloud computing environment, the operation further comprising:

using, by the cloud tuning service, the username and password to access the first cloud computing environment.

5. The system of claim 4, wherein the set of login credentials comprise: (i) a login and a password required to initiate shelving of the first workload, (ii) an indication of the first cloud computing environment, and (iii) an indication of the first host executing the first workload.

6. A computer program product, comprising:

a non-transitory computer-readable storage medium having computer-readable program code embodied therewith, the computer-readable program code executable by one or more computer processors to perform an operation comprising:

receiving, by a cloud tuning service from a first workload, a first abstract request to perform a shelving operation on the first workload, wherein the first workload is executing on a first virtual machine on a first host in a first cloud computing environment, of a plurality of cloud computing environments, wherein the cloud tuning service executes on a system external to the each of the plurality of cloud computing environments, wherein the first abstract request identifies the first workload does not identify the first host or the first cloud computing environment, does not include required credentials, and wherein the first abstract request does not include specific operations required to shelve the first workload;

determining, by the cloud tuning service, that use of a first system resource of a plurality of system resources of the first host by the first virtual machine does not exceed a threshold;

upon receiving the first abstract request, generating, by the cloud tuning service operating external to each of the plurality of cloud computing environments, a specific request that is compatible with the first cloud computing environment by:

determining, by the cloud tuning service, based on a predefined configuration, that the first workload is executing on the first host in the first cloud computing environment;

identifying a first set of commands that are specific to the first cloud computing environment based on the predefined configuration, wherein the first set of commands cause the first cloud computing environment to shelve the first workload and wherein the first set of commands includes at least one command that was not specified in the first abstract request; and identifying a set of login credentials needed to access the first cloud computing environment; and initiating, by the cloud tuning service, shelving of the first workload using the specific request, wherein the specific request includes the set of login credentials and the first set of commands, and wherein shelving the first workload removes the first workload from the first virtual machine and the first host and stores an image of the first workload in a data store.

7. The computer program product of claim 6, wherein translating the first abstract request comprises:

identifying, by the cloud tuning service, the first set of commands specific to the first cloud computing environment required to fulfill the first abstract request to shelve the first workload.

8. The computer program product of claim 7, wherein the first workload is configured to generate the first abstract request when the first workload completes processing a set of tasks, the operation further comprising:

issuing the first set of commands by the cloud tuning service to the first cloud computing environment to initiate shelving of the first workload.

9. The computer program product of claim 6, wherein the set of login credentials comprise: (i) a login and a password required to initiate performance of the shelving operation on the first workload in the first cloud computing environment, (ii) an indication of the first cloud computing environment, and (iii) an indication of a host machine executing the at least one of the first virtual machine and the first workload.

10. The computer program product of claim 6, the operation further comprising:
- monitoring, by the cloud tuning service, use of each of the plurality of system resources by the first workload;
- determining, by the cloud tuning service, that the use of a first system resource of the plurality of system resources by the first workload does not exceed the threshold; and
- determining, by the cloud tuning service based on the use of the first system resource by the first workload not exceeding the threshold, that the first workload has completed processing a set of tasks.

11. The computer program product of claim 6, wherein the shelving operation is performed on the first workload prior to expiration of a timeout value of the first workload, wherein expiration of the timeout value comprises a time threshold for performing the shelving operation on the first workload.

12. The computer program product of claim 6, the operation further comprising:
- monitoring, by the cloud tuning service, use of each of a plurality of system resources by a second workload executing on a second virtual machine on a second host in a second cloud computing environment, of the plurality of cloud computing environments;
- determining, by the cloud tuning service, that use of first system resource of the plurality of system resources by the second workload on the second virtual machine on the second host in the second cloud computing environment does not exceed the threshold;
- identifying, by the cloud tuning service, a command specific to the second cloud computing environment for deleting the second workload in the second cloud computing environment;
- identifying a set of credentials to access the second cloud computing environment; and
- issuing, by the cloud tuning service to the second cloud computing environment, the command specific to the second cloud computing environment for deleting the second workload in the second cloud computing environment.

13. The computer program product of claim 12, the operation further comprising:
- monitoring, by the cloud tuning service, use of each of the plurality of system resources by the second virtual machine on the second host in the second cloud computing environment;
- determining, by the cloud tuning service, that the use of the first system resource by the second virtual machine on the second host in the second cloud computing environment does not exceed the threshold;
- identifying, by the cloud tuning service, a command specific to the second cloud computing environment for deleting the second virtual machine in the second cloud computing environment; and
- issuing, by the cloud tuning service to the second cloud computing environment, the command specific to the second cloud computing environment for deleting the second virtual machine in the second cloud computing environment.

14. The computer program product of claim 13, the operation further comprising:
- receiving, by the cloud tuning service from a third workload in a third cloud computing environment, of the plurality of cloud computing environments, a request to delete the third workload in the third cloud computing environment;
- identifying, by the cloud tuning service, a command specific to the third cloud computing environment for deleting the third workload in the third cloud computing environment; and
- issuing, by the cloud tuning service to the third cloud computing environment, the command specific to the third cloud computing environment for deleting the third workload in the third cloud computing environment.

15. The computer program product of claim 14, the operation further comprising:
- receiving, by the cloud tuning service from a third virtual machine executing the third workload in the third cloud computing environment, a request to delete the third virtual machine in the third cloud computing environment;
- identifying, by the cloud tuning service, a command specific to the third cloud computing environment for deleting the third virtual machine in the third cloud computing environment; and
- issuing, by the cloud tuning service to the third cloud computing environment, the command specific to the third cloud computing environment for deleting the third virtual machine in the third cloud computing environment.

* * * * *